July 11, 1939.    W. G. BOETTINGER    2,165,744
TEMPERATURE COMPENSATING MEANS FOR A MEASURING INSTRUMENT
Filed Feb. 6, 1937
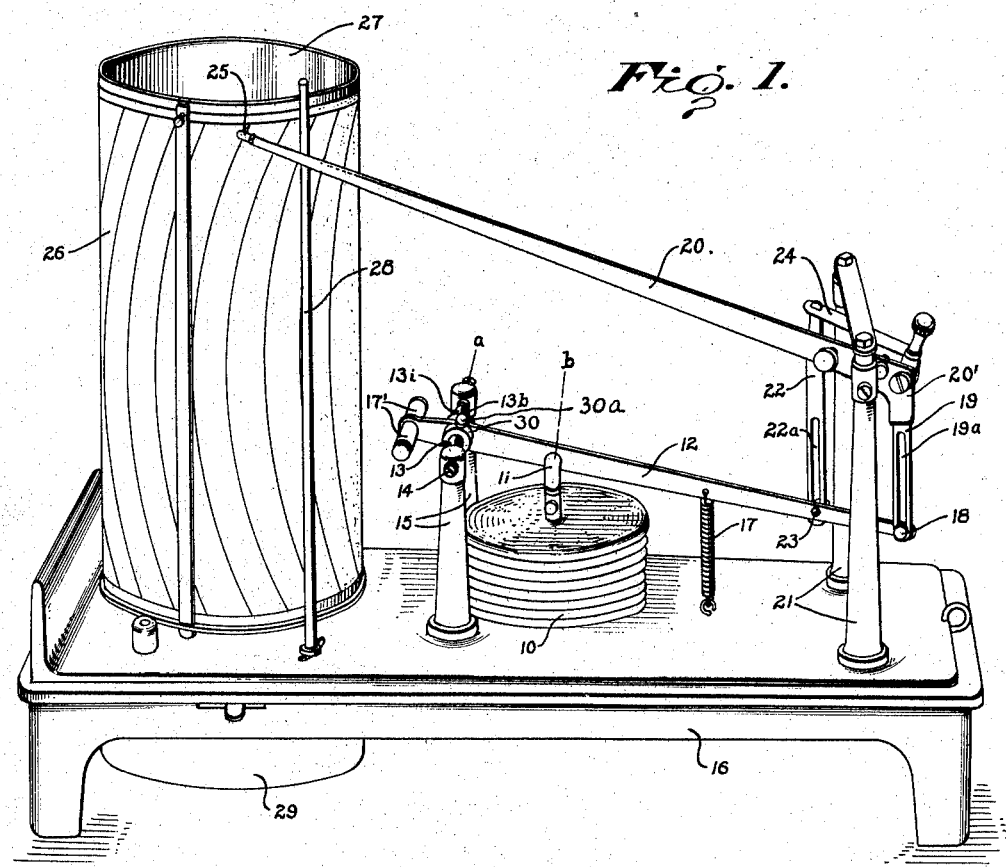
Inventor.
William G. Boettinger
By Stephen Cerstvik
Attorney.

Patented July 11, 1939

2,165,744

UNITED STATES PATENT OFFICE 2,165,744

TEMPERATURE COMPENSATING MEANS FOR A MEASURING INSTRUMENT

William G. Boettinger, Baltimore, Md., assignor to Bendix Aviation Corporation, South Bend, Ind., a corporation of Delaware Application February 6, 1937, Serial No. 124,490

7 Claims. (Cl. 73—4)

This invention relates to motion transmitting means and more particularly to means for automatically introducing corrections in the indications of precision instruments for the purpose of compensating for changes of temperature.

It has been heretofore proposed to compensate pressure responsive instruments, such as barographs, altimeters, aneroid barometers, altigraphs, and the like, for temperature changes by sealing a suitable amount of dry air or inactive gas within the bellows or other pressure responsive element of the instrument. This method of compensation has proved quite effective for a given, predetermined pressure, such as the average atmospheric pressure at the place of use, but material errors are introduced by temperature changes at pressure other than the average pressure for which compensation is made. Furthermore, a great amount of time, care and skill is required in accurately compensating a pressure responsive element in the above manner, thereby materially increasing the manufacturing cost. As a result, only approximate temperature compensation is usually made. Additionally, such compensation can be made only at the factory by trial and error methods so that corrections in the field must be made by computation.

It is accordingly one of the objects of the present invention to provide novel means in a pressure indicating or recording instrument for overcoming the above difficulties and disadvantages.

Another object of the invention is to provide a novel pressure measuring instrument which is capable of giving correct indications over a wide range of temperatures and pressures.

A further object is to provide novel, simplified means which are readily adjustable whereby a pressure responsive instrument may be adjusted to give a correct indication of the existing pressure irrespective of the temperature of the surrounding air.

Still another object is to provide novel means whereby the motion amplification ratio of a system of levers may be varied in accordance with changes in temperature.

A still further object is to provide a novel pressure measuring instrument wherein means are provided for automatically varying the amplification of the movement of the pressure responsive element to introduce corrections rendered necessary by changes in temperature.

Still another object is to provide a pressure measuring instrument embodying novel means for preventing transmission to the indicating element of the instrument of motion of the pressure responsive element which is caused by temperature changes.

The above and further objects and novel features of the invention will more fully appear from the following detailed description, when the same is read in connection with the accompanying drawing. It is to be expressly understood, however, that the drawings are for the purpose of illustration only and are not intended as a definition of the limits of the invention, reference being primarily had for this latter purpose to the appended claims.

In the drawing, wherein like reference characters refer to like parts throughout the several views, Fig. 1 is a perspective of a barograph embodying one form of the present invention;

Fig. 2 is a detail plan view, on an enlarged scale, showing one form of temperature responsive element which may be employed in carrying out the present invention; and, Fig. 3 is a diagrammatic side elevation illustrating the effect of temperature changes on parts of the instrument shown in Fig. 1.

The present invention, as will be readily apparent from the following detailed description, is adaptable to a great variety of instruments wherein corrections are rendered necessary by changes in temperature, the invention being illustrated in the accompanying drawing, by way of example only, in the form of a barograph. The latter, in the embodiment shown, comprises a pressure responsive element, such as an expansible and contractible bellows 10, said bellows being sealed to render the same responsive to changes in external pressures exerted thereon and having suitable resilient means (not shown) therein for holding the same in relatively expanded condition against external atmospheric pressure. A rigid post or link 11 is pivotally secured at one end thereof to bellows 10 for movement therewith and at its other end to an arm 12 of a motion multiplying linkage which is adapted to amplify the relatively small movements of said bellows and thus produce a readily readable indication or graphic record of said movements.

Said linkage may be of any suitable and well-known construction, the same, in the form shown, comprising arm 12 which is secured to the center portion of a novel rotatable shaft 13, the construction and operation of which more fully appear hereinafter. Shaft 13 is preferably provided with conical end portions (Fig. 2) which fit into the recessed ends of bearing bolts or screws 14, the latter being threaded through the upper ends of a pair of trunnions or posts 15 which are rigidly secured to a supporting table 16. The axis of rotation of shaft 13 is designated $a$, $a$ (see Fig. 2). Link 11 is connected to arm 12 at a pivot point $b$ between shaft 13 and the free end of the arm, the distance $a$—$b$ between said point and the axis of rotation of said shaft being preferably less than the distance between said pivot point and the free end of the arm. A tension spring 17 connected to the central portion of arm 12 and to table 16 may be provided for yieldingly resisting the expansion of pressure responsive element 10 and to eliminate loose-play and back-lash. Said spring also functions in conjunction with balance weights 17' on lever 12 to minimize vibration and eliminate position error, as when the instrument is turned upside down.

The outer end of arm 12 is provided with a laterally extending pin 18 which slidably engages a slot 19a in a vertically extending link 19 that is operatively connected at its upper end to an indicating pointer or stylus carrying arm 20. The latter is loosely mounted on a stationary shaft (not shown) extending between a pair of posts 21 and has its weight so distributed that the free end thereof will drop under the influence of gravity when element 10 expands and imparts upward movement to arm 12 and pin 18. When element 10 contracts, pin 18 moves downwardly and engages the lower end of slot 19a to thereby raise the free end of pointer 20, i. e., to pivot the same in a clockwise direction, as viewed in Fig. 1. The end 20' of arm 20 is so constructed as to constitute a balance weight having a function corresponding to that of weights 17'.

In order to make pointer 20 move through a complete up and down cycle during the range of expansion of element 10 and a complete cycle during the contracting movement thereof, a vertically extending link 22 having an elongated slot 22a for slidably receiving a pin 23 mounted on arm 12 is pivotally suspended from one end of a rocker member 24 which is loosely mounted for pivotal movement on the same shaft or cross-piece (not shown) that supports pointer 20. The other end of member 24 is operatively connected to the short or right-hand end of the pointer arm. Slot 22a is of such length that, when the free end of pointer 20 reaches the lower extent of its range of movement, pin 23 will engage the upper end of said slot so that continued upward movement of arm 12 and said pin will be effective through link 22 and rocker 24 to raise the indicating end of the pointer. In view of the fact that the linkage connections do not, per se, constitute any part of the present invention and, since the type of linkage shown is well known in the art, it is believed to be unnecessary to illustrate and describe said linkage in more detail.

The free end of pointer 20, in the form shown, is provided with a stylus 25 which is adapted to engage a chart 26 mounted on a rotatable drum 27. Arm 20 is preferably flexible and resilient in a lateral direction so that the stylus will be yieldingly held thereby against chart 26. Post 28, adjustably mounted on table 16, is provided for guiding arm 20, the same also constituting means for moving said arm out of contact with the chart. Any suitable means, such as a clock mechanism 29, may be employed for rotating drum 27.

In instruments of the above character, the coefficient or the modulus of elasticity of the metal of the bellows and of the springs used in combination therewith varies with the temperature, thereby causing the bellows to assume a different position for a given pressure at various temperatures and causing the range of movement thereof for a unit change of atmospheric pressure to vary with temperature changes. One common method for compensating said instruments for variations of temperature is by sealing within the bellows a suitable quantity of dry air or other inactive gas. Compensation may be made in this manner for a given pre-determined pressure but, to attain very accurate results, a great amount of time and skill is required to make the many tests which must be made, the correct amount of gas to enclose being determined in each individual instrument by trial and error methods. Even though accurate compensation may be effected in this manner for a given pressure, this correction is not maintained at all pressures, the range of movement of the pressure element and, hence, of the indicating pointer being increased at high temperatures and decreased at low temperatures. This variation in range of movement is caused by the variation in the coefficient of elasticity of the resilient parts and the pressure element and to the change in the volume within the pressure element, the latter resulting in different internal pressures for a given temperature at different external pressures.

Novel temperature responsive means are comprehended by the present invention whereby, when the instrument is only approximately compensated in the above manner, residual compensation for temperature changes may be made and whereby the range of movement of the indicating pointer is maintained substantially constant irrespective of temperature changes. In the illustrated embodiment of the invention, such means are constituted by a bimetallic member 13, the same being preferably made up of a piece of invar 13i and a like piece of brass 13b. Other suitable metals may, of course, be employed and the shape of the shaft may be other than cylindrical, if desired. Thus, when the temperature is low, shaft 13 will bend toward the side thereof constituted by the invar 13i. It will be noted, however, that the pivots for shaft 13 and, hence, the axis of rotation $a$, $a$ remain stationary irrespective of the bending movements thereof in response to temperature changes. The movement or amount of bend of shaft 13 for a given change of temperature is determined by the kinds and relative amounts of metals employed therein as well as by the length and diameter or thickness of the shaft. The proper dimensions for shaft 13 to render the same effective to compensate for the average loss or gain in movement of the pressure element due to changes of temperature may be determined by experiment. If desired, shaft 13 may be so constructed as to be straight at a predetermined normal temperature and adapted to bend in one direction for sub-normal temperatures and in the other direction for abnormal temperatures.

To render shaft 13 capable of compensating for the variation in the range of movement of the pointer 20, arm or lever 12 is secured to shaft 13 with the adjacent faces of parts 13i and 13b perpendicular to the longitudinal center line of said arm, i. e., the line joining the axis of rotation $a$ of shaft 13 and the pivot $b$ between arm 12 and link 11. The bending of said shaft will then change the ratio of the effective lengths of the portions of arm 12 on opposite sides of pivot b without causing noticeable movement of pointer 20, said change, however, being effective to vary the motion multiplication ratio of the linkage which transmits the motion from pressure responsive element 10 to pointer 20. For example, when the center of shaft 13 moves from the full line position to the dotted line position in Fig. 3, axis a, a, as pointed out above, remains stationary while pivot b moves to b', thereby shortening the effective length of that portion of arm 12 between axis a, and pivot b. The length of that portion of arm 12 between pivot b and pins 18 or 23 remains stationary, however, irrespective of the bending movement of shaft 13. Accordingly, when the temperature is high, the length of lever a—b is longest to thereby reduce the multiplication ratio of the linkage and, hence, compensate for the increased expansion of bellows 10. When the temperature is low and the expansion of the pressure element is decreased for a given change of pressure, shaft 13 is effective to shorten the length of lever a—b and thus increase the multiplication ratio of the motion transmitting linkage. The movement of the free end of pointer 20 may accordingly be maintained constant for given changes in the pressure acting on element 10 irrespective of temperature changes.

As pointed out above, the extent of the binding movement of shaft or bar 13 per unit change in temperature is dependent upon the length, among other things, of said shaft. Novel means are accordingly provided whereby the effective length of said shaft may be readily adjusted or varied, said means, in the form shown, comprising a close fitting sleeve 30 on said shaft, the length of which sleeve may be varied. Said sleeve may be installed anywhere along the compensating shaft 13, the same constituting the hub or bushing on which arm 12 is mounted in the illustrated embodiment. Said sleeve is connected to the bi-metal bar 13 by means of a set screw 30a. By varying the length of sleeve 30, the deflection of bar 13 per degree change of temperature may be regulated.

To correct for any residual error at a predetermined pressure after element 10 has been approximately compensated for temperature changes by sealing a quantity of dry air therein, shaft 13 may be installed with the adjoining faces of parts 13i and 13b parallel to or in line with the longitudinal center line of bar 12 and with the brass portion 13b uppermost. When the temperature of the surrounding air is below normal, the expansion of element 10 for a given pressure is less than at normal temperature, the effect of this decreased expansion being to cause stylus 25 to move upwardly beyond its correct position for the existing pressure. Under these conditions, bar 13, when the same is in the position last described, will bend downwardly thereby pivoting lever 12 in a counter-clockwise direction about pivot b and lowering stylus 25 to it's correct position. The reverse action takes place when the temperature is above normal. It will, of course, be understood that the direction of residual error for sub-normal and abnormal temperatures may be the reverse of those assumed above, depending on the quantity of dry air that is sealed in pressure element 10. If the error is reversed, the correction may likewise be reversed by turning shaft 13 through 180 degrees.

It will thus be seen that the component of the bending movement of shaft 13 taken at right angles to a plane containing axis a, a and pivot b is effective to compensate for variations in the position of element 10 for a given pressure at different temperatures while the component of said movement in said plane is effective to compensate for variations in the range of movement of said pressure element caused by changes of temperature. Accordingly, by loosening set screw 30a and turning shaft 13 relative to lever 12 from either of the two positions above described, said shaft will become effective to compensate for both the position and range of movement of element 10 and, hence, of pointer 20. Adjustment of the novel temperature compensating means comprehended by this invention may thus be readily accomplished in the field as well as at the factory. If desired, two bimetallic shafts may be employed for supporting different links of the motion transmitting linkage, one being positioned to correct for range of movement and the other being adjusted to correct for the position of the pressure responsive element, or the pointer, at given pressures.

There is thus provided novel means adapted particularly for use in combination with precision instruments whereby errors introduced by changes in temperature may be compensated for, said means being of simple construction and inexpensive to manufacture. The novel means provided may, of course, be employed in any type of instrument or apparatus for varying the multiplication ratio of a motion transmitting linkage in accordance with changes in temperature. Additionally, said means are readily adjustable and, hence, render a pressure responsive instrument embodying the same capable of giving correct indications in different localities in which the normal conditions of pressure and temperature are different.

Although only a single embodiment of the invention has been illustrated and described in detail, it is to be expressly understood that various changes may be made therein. For example, arm 12 may constitute the indicating or recording pointer if the motion amplification desired is small and it is not necessary that the pressure responsive element be first approximately temperature compensated in the manner pointed out. Other changes may also be made in the design and arrangement of parts illustrated without departing from the spirit and scope of the invention, as will now be apparent to those skilled in the art. For a definition of the limits of the invention, reference is had primarily to the appended claims.

What is claimed is:

1. In apparatus of the class described, an indicating arm, a pressure responsive element comprising a partially evacuated bellows, means including a motion amplifying linkage for connecting said arm and said belows, and temperature responsive means comprising a bi-metal rockshaft forming the support and pivot for a lever of said motion amplifying linkage.

2. In apparatus of the class described, a pair of movable members, a motion multiplying linkage for transmitting motion from one of said members to the other, and temperature responsive means comprising a bi-metal rockshaft forming the support and pivot of a lever of said motion multiplying linkage.

3. In a device of the character described, a pressure responsive element, a pointer, means connecting said element and pointer whereby the movement of said element is transmitted to said pointer according to one ratio, a bi-metal rockshaft, mounted for rotation about two fixed bearings, a part of said connecting means being connected to said rock-shaft for pivoted movement about its bearings whereby expansion of said rock-shaft causes a transmission of said movement at a different ratio, and means for adjusting the initial rotative position of said rockshaft whereby the amount of ratio alteration may be initially predetermined.

4. A device of the character described, comprising pressure responsive means, indicating means, means connecting said pressure responsive means and said indicating means comprising a system of pivoted levers, means connecting one of said levers to said indicating means at one end thereof, means connecting said one lever to said pressure responsive means at a point intermediate its ends, and means pivotally mounting the other end of said lever, comprising a bi-metal rockshaft mounted for rotation about two fixed points whereby the expansion and contraction of said rockshaft alters the ratio of the two arms of said lever.

5. In a device of the character described, means responsive to changes in a condition of the atmosphere, motion transmitting means connected to said condition responsive means, an indicator connected to said motion transmitting means for actuation thereby, and a bi-metal rockshaft journaled for rotation, said motion transmitting means being connected to said rockshaft for motion about said rockshaft as a pivot.

6. In a device of the character described, a rockshaft composed of two layers of dissimilar materials, and adjustable bearings mounting said rockshaft for rotation, the line of intersection of said layers being aligned with said bearings.

7. In a device of the character described, a bi-metal rockshaft, adjustable bearings mounting said rockshaft for rotation thereabout, and an encircling sleeve surrounding said rockshaft whereby the effective buckling length is decreased.

WILLIAM G. BOETTINGER.